United States Patent [19]

DiMatteo

[11] 4,292,724
[45] Oct. 6, 1981

[54] ARRANGEMENT FOR CONSTRUCTING SURFACES AND BODIES

[75] Inventor: Paul DiMatteo, Huntington, N.Y.

[73] Assignee: Solid Photography, Inc., Melville, N.Y.

[21] Appl. No.: 91,142

[22] Filed: Nov. 5, 1979

[51] Int. Cl.³ .................... B23P 17/00; B32B 31/00
[52] U.S. Cl. ................................ 29/418; 156/257; 156/267
[58] Field of Search .............. 29/411, 413, 414, 418, 29/426.4, 426.5, 467, 445, 455 LM, 609; 156/257, 264, 267

[56] References Cited

U.S. PATENT DOCUMENTS

| | | | |
|---|---|---|---|
| 2,903,390 | 9/1959 | Kojima | 29/418 X |
| 2,926,490 | 3/1960 | Eaton et al. | 29/609 X |
| 3,044,257 | 7/1962 | Shesta | 29/445 |
| 4,101,361 | 7/1978 | Fukuda et al. | 29/418 X |

*Primary Examiner*—Ervin M. Combs
*Attorney, Agent, or Firm*—Max Fogiel

[57] ABSTRACT

An arrangement for the construction of surfaces and bodies by stacking planar elements against each other. The planar elements have cross-sections corresponding to respective cross-sections of the surface to be constructed. The planar elements are assembled and attached to each other in sections, with neighboring sections being detached from each other so that the planar elements may be produced by cutting through plate-shaped material, and the cut-out elements are held to the parent plates by tabs. The tabs are arranged in a staggered manner among the sections of planar elements to facilitate easy removal of the planar elements from the remaining plate-shaped material to be discarded.

8 Claims, 7 Drawing Figures

ARRANGEMENT FOR CONSTRUCTING SURFACES AND BODIES

BACKGROUND OF THE INVENTION

The construction of surfaces based on the principle of stacking planar elements and connecting them to each other by adhesive means, for example, is already known in the art. However, the method and construction of the planar elements so that they can be readily assembled and separated from their parent or base plates or sheets, has had serious disadvantages.

Thus, the planar elements are cut from parent plates or sheets by punching or laser cutting, and the planar elements are held to the parent plates by tabs after the cutting operations have been performed. After the planar elements together with the parent plate material have been attached to each other through adhesive means, it becomes necessary to remove the plate-shaped material from the planar elements which form the desired surface or body. The removal of such plate-shaped material has been found, in the past, to result often in fracturing also the planar elements which are used to construct the desired surface when the tabs are severed or broken. When pulling on the plate-shaped material which is to be discarded, furthermore, distortion of the planar elements has also resulted as a consequence of the forces that were applied to the tabs during the breaking-away process of the planar elements from the parent plate material.

Accordingly it is an object of the present invention to provide an arrangement for separating the wanted planar elements from the unwanted parent base or plate material in a simple manner which leaves the planar elements unfractured and undistorted.

Another object of the present invention is to provide an arrangement of the foregoing character which is economical and produces minimum material wastes.

A further object of the present invention is to provide an arrangement, as described, which may be applied readily without requiring special tools.

SUMMARY OF THE INVENTION

The objects of the present invention are achieved by producing or preparing the planar elements by cutting plate-shaped or sheet material so that the planar elements are substantially cut out of the parent material along an annular cut space which conforms substantially to the contour or outline of the planar elements. The cutting operation is performed so that the planar elements are held to the parent or base material by tabs distributed along the contour in sufficient number to hold the planar element adequately in place.

The planar elements together with the base plate or sheet material are then attached to each other by the application of adhesive to form sections of attached planar elements. Sections of the planar elements are then assembled together without applying adhesive between sections. The tabs are staggered from section to section so that severing forces applied to the tabs of one section, are not transmitted to the tabs of the other section. Adhesive material may also be applied between sections with predetermined surfaces, whereby the sections are all fixed in place relative to each other.

In cutting the plate-shaped material to form the planar elements, the cutting operation can be performed at angles which are not perpendicular to the plane surfaces of the plates, for the purpose of conforming more closely to a smooth contour or profile of the surface to be constructed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
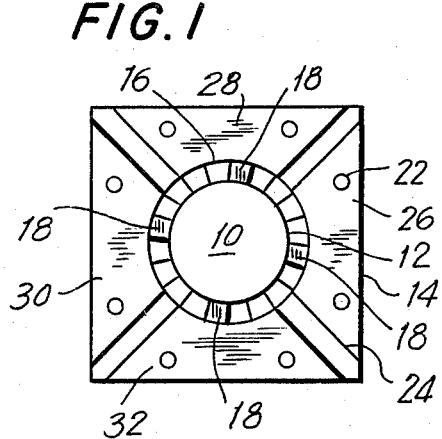
FIG. 1 is a top view of a stacked arrangement of planar elements to form a cylindrical surface, in accordance with the present invention.

Referring to the drawings and in particular FIG. 1, a cylindrical surface 10 is constructed by cutting a series of planar-shaped elements 12 from a parent base plate member 14. The planar-shaped elements 12 of circular cross-section are cut from the plate member 14 by leaving a cut-out annular space or gap 16 between the planar elements and the remaining base material. The cutting procedure is applied, however, to leave a series of tabs 18 distributed within the space 16, so that the element 12 is held in place to the remaining base plate material 14. In the example of a cylindrical surface shown in FIGS. 1 and 2, the tabs 18 may be distributed at intervals of 90°, for example. The same results may also be obtained if, for example, only three tabs are used spaced at intervals of 120°.

Figure 2:
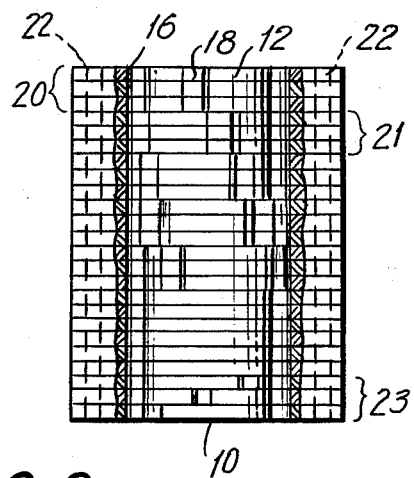
FIG. 2 is a front view of the arrangement of FIG. 1 with parts broken away, and shows the staggered arrangement of tabs among sections of planar elements.

The plate material 14 can be made of cardboard or wood, for example, and the planar elements 12 are attached to each other by applying adhesive in the form of glue. Referring to FIG. 2, it is seen that a number of such planar elements 12 are combined to form a section 20 in which the tabs 18 are aligned within the section, but are displaced from similar tabs in a neighboring section 21. As may be seen from FIGS. 1 and 2, the cylindrical surface 10 is constructed from the stacks of planar elements 12.

To align the plate members 14 and to aid in the removal of the unwanted base plate material from the cylindrical surface 10, rods 22 are passed through the stack of the members 14. In addition thereto, cuts 24 are applied through the entire stack, so that the planes of the cuts 24 are, for example, parallel to the rods 22.

If, as a result of the cuts 24, forces are applied to the rods 22 for the purpose of pulling the right-most portion 26 from the stacked planar elements 12, the tabs connecting the planar elements 12 to that portion 26 will become fractured or severed. The staggering of tabs 18 among the sections is important in the removal of the portion 26, because if the tabs were not staggered, they would form a vertical column in FIG. 2, for example, and a substantially large force would be necessary in order to sever all of the tabs in the vertical column simultaneously. Such a large force results in fracturing of the tabs at the surfaces of the elements 12 along their edges, resulting in an irregular or broken cylindrical surface that has a pitted appearance. The large forces needed for removal of such aligned tabs, furthermore, also result in distortion of the planar elements 12, as the forces are applied to the tabs 18 and are transmitted therethrough. The staggering of the tabs 18 from section to the neighboring section as shown in FIG. 2, results in the requirement of reduced forces, and the forces applied to one section 20 of tabs, is thereby substantially independent of the forces applied to the tabs in section 21.

Once the portion 26 is removed by severance of the associated tabs 18, and the remaining portions 28, 30 and 32 are similarly removed by applying appropriate pulling forces on the rods 22, the cylindrical surface 10 is left in place. Any severed tab portions remaining on the surface may be removed by grinding or polishing, for example. Through such grinding procedure the cylindrical surface 12 may be made smooth.

The cutting procedure for cutting out the planar elements 12 from the plate members 14, may be accomplished by a punching process using stamping dies, for example, or a laser cutting procedure.

Figure 3:
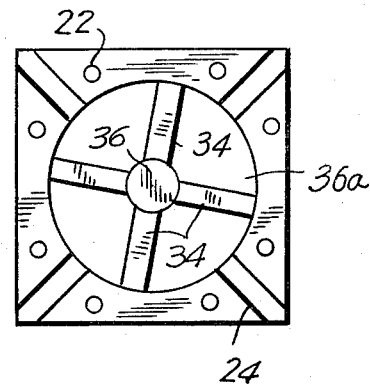
FIG. 3 is a top view of stacked planar elements, similar to the arrangement of FIG. 1, with the exception that the cylindrical surface to be constructed is connected by tabs of substantially long length to the base material.

Whereas relatively short tabs 18 are shown in FIG. 1 within the cut-out space 16, a predetermined design of another cylindrical surface 36 may involve substantially long connecting tabs or arms 34, as shown in FIG. 3. Thus, the supporting arms 34 in FIG. 3 have a length which is substantially larger than the diameter 36, in comparison with FIG. 1 where the diameter of the cylindrical surface 10 is substantially larger than the tabs 18.

Whereas the tabs are shown aligned within sections 20 and 21 (FIG. 2), the tabs may also be staggered within a section such as illustrated by the section 23. Furthermore, if the cylindrical surface 10 is the object which is wanted and the remaining base material 14 is the unwanted material, then adhesive is applied on all planar surfaces of the elements 12, including along the planes where the sections meet. However, adhesive is omitted along the parting section planes of the unwanted base plate material 14. Thus, adhesive is applied to all of the planar surfaces of the base or parent plates 14 except where the sections begin and end. Those surfaces are left free of adhesive so that when forces are applied to the rods 22, the unwanted sections are broken from the wanted surface 10, independently of each other so that the forces from one section are not transmitted to the other section, whereby the severing process for one section is independent of the severing process of the neighboring section. Further, by slightly tilting a rod being pulled the force may be increased at one section and reduced at another.

Figure 4:
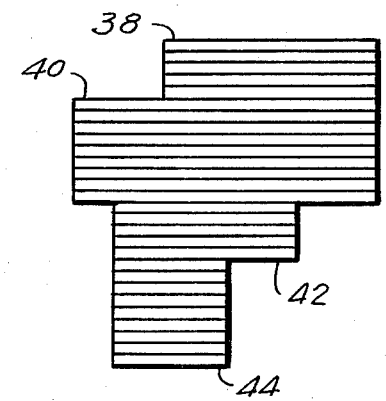
FIG. 4 shows a stacked arrangement of planar elements arranged in sections which are detached from each other.
Figure 5:
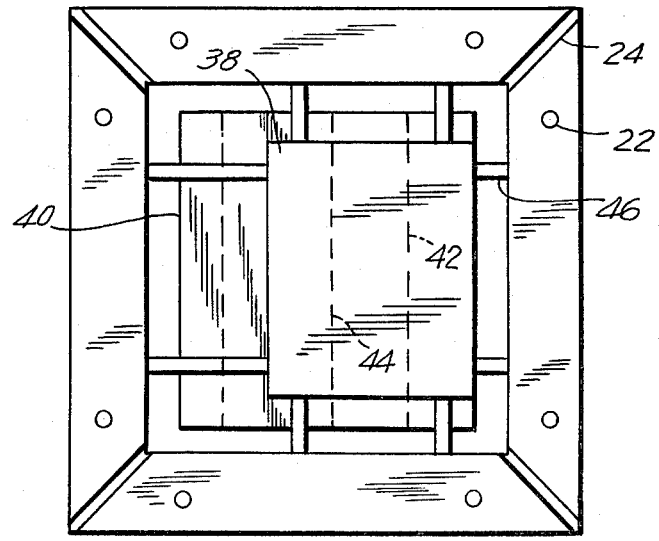
FIG. 5 is a top view of the arrangement of FIG. 4.

FIGS. 4 and 5 illustrate a surface which may be conveniently subdivided into sections 38, 40, 42, 44, and the unwanted parent or base plate portions may be broken away from the corresponding sections. Whereas each of the sections are attached to each other by adhesive in FIG. 4, whereby all planar surfaces have adhesive on them, the unwanted portions shown in FIG. 5 do not have adhesive where the sections meet. This procedure then allows the tabs 46 to be readily severed by applying appropriate pulling forces, for example, to the rods 22. As shown by FIG. 4, the stacking of the sections need not be uniform. The design of a particular structure may dictate the number of planar elements to be included within a section, and neighboring sections may have different ones of such elements.

Figure 6:
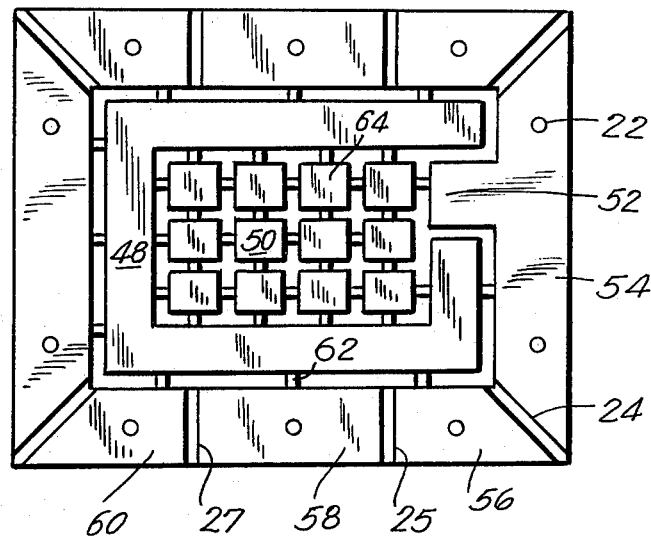
FIG. 6 is a top view of a stacked arrangement of planar elements forming a predetermined contour having an internal area to which access is not readily available for removing unwanted base material therefrom.

FIG. 6 shows a surface 48 in which this surface has an interior configuration 50 that is accessible only through the portion 52 from the outside. Thus, the interior portion 50 forms a core of the surface 48 which is substantially a closed surface except for the portion 52.

After the unwanted portions 54, 56, 58, 60, for example, are removed in a manner already discussed, it is necessary to then remove the core 50. In view of the structural dimensions of the wanted surface 48, auxiliary parting cuts 25 and 27, for example, may be added to the cuts 24 used in the previous configurations of FIGS. 1–5. The auxiliary parting cuts 25 and 27 facilitate the removal of the unwanted portions, and make it possible to reduce the magnitudes of the forces which need to be applied to the rods 22 for removal of the unwanted portions by severing the tabs 62.

In order to remove easily the core 50, the latter may be subdivided into substantially small portions or blocks, as illustrated in FIG. 6. The smaller blocks 64 may be easily broken away from their neighboring blocks, as well as from the internal wall of the surface 48. By reducing the blocks 64 to relative small dimensions, the interior core of the surface may be removed or broken away in a controlled manner, whereby substantially little force is required to remove the blocks by severing the respective tabs. The planar surfaces between blocks are left free of adhesive, so that the blocks may be removed independently of each other. Thus, whereas the planar surfaces of the plate or sheet material are attached to each other by adhesive within the blocks, no such adhesive is present at the surfaces of separation between the blocks, so that the blocks are freely movable relatively to each other when forces are applied to sever them from the tabs connected to the surface 48 and to neighboring blocks.

In cutting out the planar elements from plate material, the cuts 66 (FIG. 7) are often perpendicular to the planar surfaces. Thus, if the plate material is held horizontally during the cutting process, for example, then the cut is applied vertically, as shown by the cut 66 in FIG. 77. Such cutting action results in a stepped arrangement which may not follow precisely the outline or contour of a smooth surface.

Figure 7:
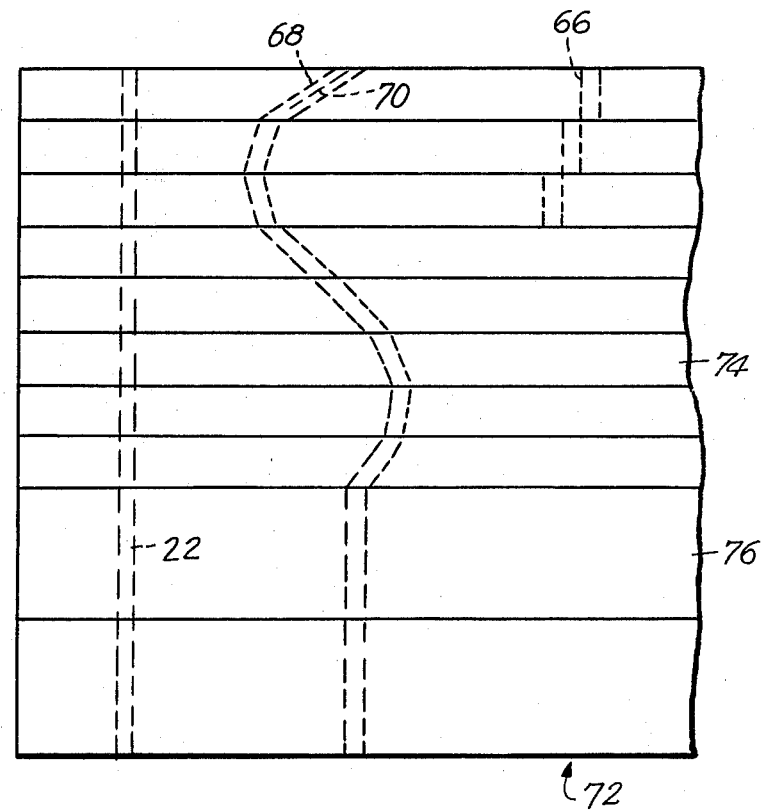
FIG. 7 is a partial front view of a stacked arrangement of planar elements in which the elements are cut from the base plate material, at angles conforming substantially close to the smooth contour of the surface to be constructed.

To provide for approximating the smooth outline or contour of a surface, the planar elements may be cut by applying the cuts at angles corresponding to the slopes of the surface to be constructed. Accordingly, the cut 68 in FIG. 7 is applied at an inclination with respect to the planar surfaces, so that the cut approximates more closely the contour 70 of the surface. By successively adjusting the inclination of the cuts in the stacked planar elements, it is possible to closely approximate the profile of the surface 72 to be constructed.

In accordance with the present invention, substantially thin planar elements 74 are used for portions of the surface which have a considerable varying profile or contour. Relatively thicker elements 76, however, may be used for those portions of the surface in which the profile remains substantially constant. As a result, the thickness of the planar elements may also be varied as a function of the variation in slope of the surface to be constructed.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for constructing a predetermined surface comprising the steps of: defining cross-sections of said surface; generating a substantially planar element for each cross-section from base material having a substantially rectangular cross-section by removing material within a gap following the outline of the cross-section, said gap being discontinuous and being interrupted by tabs connecting the planar element to the base material, said tabs comprising material not removed in said gap during said material removing step; arranging locations of said tabs so that said tabs are in staggered relationship to each other when the planar elements are stacked against each other; attaching the planar elements to one another and stacking the planar elements in predetermined sequence to form such surface, the sequence of the stacked elements corresponding to the sequence of the cross-sections of said surface.

2. A method as defined in claim 1 wherein said base material is a planar material forming planar members to which said elements are attached by said tabs, said planar members being attached to each other when said planar elements are attached to one another except at predetermined surfaces of said planar members so that a section of a plurality of planar members is detached from a neighboring section of planar members, the planar members in a section being attached to each other.

3. A method as defined in claim 2 including the step of inserting rods through stacked planar members and removing said planar members from said planar elements by severing said tabs due to applying a force on said rods.

4. A method as defined in claim 3 including the step of cutting said planar members along parting lines to facilitate removal of said planar members from said planar elements.

5. A method as defined in claim 1 including subdividing said base material into block-shaped members connected to each other by tabs.

6. A method as defined in claim 1 wherein tabs of a predetermined number of planar elements are aligned relative to each other and are staggered relative to tabs of an adjacent plurality of planar elements.

7. A method as defined in claim 1 including the step of removing material within said gap so that the internal walls of the gap have an inclination corresponding to the respective slopes of the surface.

8. A surface produced by the method of claim 1 comprising a plurality of stacked cut planar elements having residual severed tabs on their peripheries, said planar elements being connected to each other and forming said surface.

* * * * *